(12) United States Patent
Eastep et al.

(10) Patent No.: US 9,829,902 B2
(45) Date of Patent: Nov. 28, 2017

(54) SYSTEMS AND METHODS FOR DYNAMIC TEMPORAL POWER STEERING

(71) Applicant: Intel Corporation, Santa Clara, CA (US)

(72) Inventors: Jonathan M. Eastep, Portland, OR (US); Rohit Banerjee, Portland, OR (US); Richard J. Greco, West Linn, OR (US)

(73) Assignee: INTEL CORPORATION, Santa Clara, CA (US)

(*) Notice: Subject to any disclaimer, the term of this patent is extended or adjusted under 35 U.S.C. 154(b) by 422 days.

(21) Appl. No.: 14/581,911

(22) Filed: Dec. 23, 2014

(65) Prior Publication Data

US 2016/0179117 A1  Jun. 23, 2016

(51) Int. Cl.
  *G06F 1/00* (2006.01)
  *G05F 1/66* (2006.01)
  *G05B 15/02* (2006.01)
  *G06F 1/32* (2006.01)

(52) U.S. Cl.
  CPC .......... *G05F 1/66* (2013.01); *G05B 15/02* (2013.01); *G06F 1/3287* (2013.01)

(58) Field of Classification Search
  CPC .......... G06F 1/3287; G05B 15/02; G05F 1/66
  See application file for complete search history.

(56) References Cited

U.S. PATENT DOCUMENTS

| | | | |
|---|---|---|---|
| 5,964,879 A | 10/1999 | Dunstan et al. | |
| 8,839,006 B2 | 9/2014 | Li et al. | |
| 2006/0218423 A1 | 9/2006 | Diefenbaugh et al. | |
| 2006/0294400 A1 | 12/2006 | Diefenbaugh et al. | |
| 2007/0049133 A1* | 3/2007 | Conroy ............. | G06F 1/26 439/894 |
| 2012/0185706 A1 | 7/2012 | Sistla et al. | |
| 2013/0318334 A1 | 11/2013 | Waskiewicz, Jr. | |
| 2014/0067139 A1 | 3/2014 | Berke et al. | |
| 2014/0082377 A1 | 3/2014 | Dinh et al. | |
| 2014/0181545 A1 | 6/2014 | Shrall et al. | |
| 2014/0181553 A1 | 6/2014 | Eckert et al. | |
| 2014/0189398 A1 | 7/2014 | Gorbatov et al. | |

OTHER PUBLICATIONS

PCT/US2015/05535, International Search Report and Written Opinion, dated Feb. 24, 2016, 14 pages.

* cited by examiner

*Primary Examiner* — Xuxing Chen
(74) *Attorney, Agent, or Firm* — Stoel Rives LLP (57) ABSTRACT

Apparatus, systems, and methods provide dynamic power steering that includes determining a sequence of phases of an application in a node. The sequence corresponds to a time interval associated with an energy budget. For each phase, the dynamic power steering includes determining a power scaling comprising a measured response to an increase or decrease in power distributed to a plurality of power domains in the node, and based on the power scaling for each phase, determining a temporal power distribution between the phases in the sequence to satisfy the energy budget.

25 Claims, 5 Drawing Sheets

SYSTEMS AND METHODS FOR DYNAMIC TEMPORAL POWER STEERING

GOVERNMENT INTEREST

This invention was made with Government support under contract number H98230-11-3-0011 awarded by the Department of Defense. The Government has certain rights in this invention.

TECHNICAL FIELD

This disclosure generally relates to power management for servers and other computing devices.

BACKGROUND

Advances in semiconductor processing and logic design have permitted an increase in the amount of logic that may be present on integrated circuit devices. As a result, computer system configurations have evolved from multiple integrated circuits in a system to multiple hardware threads, multiple cores, multiple devices, and/or complete systems on an individual integrated circuit. As the density of integrated circuits has grown, the power requirements for computing systems (from embedded systems to high performance computing (HPC) systems) have also escalated.

Power and thermal management issues are considerations in designing computer-based systems. In HPC systems, for example, a specified thermal design power (TDP) and/or the cost of electricity may drive the need for low power systems. In other systems, including mobile systems, battery life and thermal limitations make these issues relevant. Optimizing a system for maximum performance at minimum power consumption is usually done using the operating system (OS) or system software to control hardware elements.

Some models for power and thermal control may monitor the running average power of a hardware device over a relatively large and dynamically adjustable window of time and maintain this average power at or below a given threshold. Such an approach may enable the device to consume above-limit power for short durations (as long as the running average power remains within the limit), but the device power supply and cooling solution put limits on the magnitude and length of the excursion.

BRIEF DESCRIPTION OF THE DRAWINGS

Arrangements and embodiments may be described in detail with reference to the following drawings, in which like reference numerals refer to like elements.

DETAILED DESCRIPTION OF EMBODIMENTS

Embodiments disclosed herein are generally directed to an apparatus, method, and other techniques for managing workloads on a computer system. A software application executed by a computer system may include a group of tasks that work together toward a common purpose (e.g., computing a solution to a problem). The tasks may execute on one or more nodes. Inside a node, there may be one or more tasks, and each task may include one or more processing threads. Certain embodiments provide dynamic temporal power steering between phases of an application executed by an apparatus or computer system. For each phase, the power is distributed among a plurality of power domains in the computer system.

The term power domain, or simply domain, is used herein to refer to any component or set of components capable of being monitored and controlled for power consumption. Certain embodiments automatically break the execution time of an application or system behavior into segments that exhibit a stable or predictable operational behavior. The stable or predictable segments are referred to herein as "phases" of an application. Each of the phases comprises, for example, a segment of the application that exhibits operational behavior different than that of the other phases. A phase may include, for example, a compute bound phase, a memory bound phase, a communication bound phase, a mixed compute/memory/communication phase, an idle phase, an active phase, and/or another phase bound to any operational behavior. Different phases of an application may have different in resources or domains (e.g. cores, uncore, memory, etc.) in a node (e.g., server).

By identifying opportunities for more efficient power usage across phase boundaries in the temporal dimension, performance of the application may be optimized or improved. For example, dynamic temporal power steering may identify that reducing a computer system's power limit during a memory bound phase, while potentially reducing the memory bound phase's performance, and giving that power to a compute bound phase (i.e., proportionally increasing the computer system's power limit during the compute bound phase) may improve the overall application performance.

Dynamic temporal power steering embodiments determine or learn the behavior of the application as a whole, and identify opportunities to improve performance by transferring power (i.e., decreasing or increasing the computer system's power limit) from one phase to another. As discussed in detail below, for example, certain embodiments intentionally reserve power during phases whose performance does not scale well with power (e.g., the performance increase is disproportionately low compared to the power increase required to raise the performance), and use the extra power to boost performance of phases whose performance scales better with power, which results in higher application performance while globally preserving the energy budget.

Such embodiments may provide a demonstrable increase in application performance or other objective function of power management (e.g., to improve system efficiency metrics such as energy-delay product (EDP) or energy-delay-square product (ED2P)), as compared to other power management approaches. While other approaches operate under a paradigm of never harming the objective function of power management (e.g., performance, efficiency, EDP, ED2P, etc.), certain embodiments disclosed herein may intentionally "damage" the objective function of power management in some phases to create larger improvements in other phases so as to improve the objective function of power management as a whole for the application.

For purposes of discussion herein, certain examples may be described with regard to high performance computing (HPC) systems. However, the scope of the present disclosure is not limited to HPC examples, and embodiments are highly scalable to enable solutions for many different types of computer systems ranging from higher power computer systems such as any large cloud, big data, HPC, or other systems to low power computer systems such as laptop or Ultrabook™, tablet computers, smartphones, and other portable devices. Embodiments apply equally to systems having power requirements in between high power and low power systems such as desktop computers.

Other solutions either statically assign power to domains based on a characteristic like average power over the whole application run, or monitor and dynamically allocate power but do it based on application characteristics over a history of behavior in the last k time windows. If power is assigned statically to domains, there may be times when a particular domain uses all of its power allocation, times when the domain could perform faster if given more power, and times when the domain will not use the full power budget (i.e., power is stranded). Solutions that assign power dynamically based on a history of behavior in time windows can improve stranding of power for applications with a steady-state behavior throughout (single phase), but may provide little or no improvement for applications that have multiple phases with different characteristics. Such solutions monitor behavior at time windows (fixed or variable) that blend together the behavior of any phases executing (partially or completely) during the intervals. Such solutions assume that blended behavior in past windows will be a good predictor of future behavior, but each time window may contain disparate application phases with different operational behavior and different optimal power allocations.

Because HPC software applications have multiple phases with different operational behavior (and thus with different activity in the domains), a static assignment of power to domains may not be optimal. For example, suppose that a computer comprises two domains, one being the processor and one being the main memory (e.g., dynamic random-access memory (DRAM), non-volatile memory, or other memory device). Suppose that the computer cannot exceed an average power of 100 W and that, through characterization of the application over all of its phases, the best static assignment is determined to be an average power limit of 50 W for the processor and an average power limit of 50 W for the main memory. 50 W is determined to be best in this example because average power cannot be reduced below 50 W in the memory bound phases without severely increasing application runtime. Yet, during compute bound and communication bound application phases, there is not enough memory activity to utilize the full 50 W reserved for the main memory domain. Thus, the static assignment results in stranded power (power reserved for domains above the current domain needs) and sub-optimal performance.

HPC clusters or supercomputers may run "power-constrained" such that a power cap is lower than the power that an application would require to reach a highest performance. In the power-constrained scenario, using power as efficiently as possible increases performance. The power cap is the maximum average power that can be used by the system over a defined time period. The power cap may be opportunistically exceeded, however, so long as the average power usage over a pre-determined time period does not exceed the power cap.

In certain embodiments, various power domains are monitored and controlled based on a running average power limit (RAPL). A power manager may specify the RAPL for each of the available power domains, and enforce the RAPL power limit by modulating low level performance parameters such as power controls and/or discrete processor performance states (P-states). In certain such embodiments, dynamic spatial power steering includes learning an optimal allocation of power among the various RAPL power domains for each of the application phases. HPC applications and other applications may demonstrate repetitive behavior where the same phases occur over and over again. Certain embodiments exploit this operational behavior. Once the optimal or improved power allocation has been learned or determined for a particular phase, it can be re-used (e.g., immediately) when the application enters that same phase in the future.

Various embodiments also relate to an apparatus or system for performing the operations disclosed herein. The apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the disclosed methods. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the embodiments can be practiced without these specific details. In other instances, well-known structures and devices are shown in block diagram form in order to facilitate a description thereof. The intention is to cover all modifications, equivalents, and alternatives consistent with the claimed subject matter.

Figure 1:
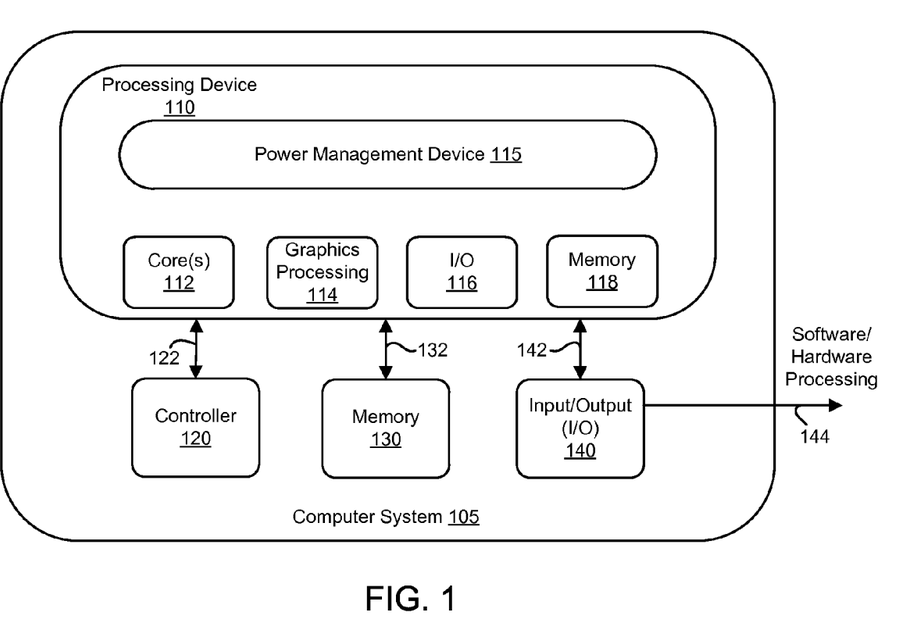
FIG. 1 illustrates an embodiment of an example computer system suitable for implementing various embodiments described herein.

FIG. 1 illustrates an embodiment of an example computer system 105 suitable for implementing various embodiments described herein. In various embodiments, the computer system 105 comprises a processing device 110, a controller 120, a memory device 130, and an input/output (I/O) device 140. The processing device 110 may be any type of computational element, such as but not limited to, a server (e.g., in a bay in a rack of servers), a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing device 110 may be connected to and communicate with the controller 120, the memory device 130, and the I/O device 140 via interconnects 122, 132 and 142, respectively. Moreover, the controller 120, the memory device 130, and the I/O device 140 may communicate with all of the components of the processing device 110.

While not limited in this respect, the processing device 110 may comprise a power management device 115, one or more processing cores 112, a graphics processing unit 114, an I/O device 116, a memory device 118, and any other uncore (non-core) components (not shown). Uncore components may include other memory, caches, I/O devices and controllers. In some embodiments, the processing device 110 may include more than two processing cores, for example. The one or more processing cores 112 may have more than one processing unit. The one or more processing cores 112 include, but are not limited to, pre-fetch logic to fetch instructions, decode logic to decode the instructions, execution logic to execute instructions, and other logic.

In certain embodiments, the processing device 110 comprises a graphics processing unit 114. The graphics processing unit 114 may function as an adjunct processor that manages graphics and/or video operations and/or processing.

The processing device 110 comprises an I/O device 116 and a memory device 118 in some embodiments. The I/O device 116 provides an external interface for the processing device 110 to other devices within the computer system 105. In addition, the memory device 118 stores instructions and/or data of the processing device 110, and in particular, the one or more processing cores 112. The memory device 118 may also store temporary variables or other intermediate information while the processing device 110 and the one or more processing cores 112 are executing instructions. In another embodiment, the memory device 118 includes, but is not limited to, level one (L1), level two (L2) and level three (L3) cache memory or any other configuration of the cache memory within the processing device 110. The processing cores 112, the graphics processing unit 114, the I/O device 116, and the memory device 118 may communicate with each other via interconnects (not shown).

The controller 120 may include a microcontroller or other type of processing circuitry, memory and interface logic. In some embodiments, the controller 120 may monitor and control operation of the computer system 105 including, but not limited, monitoring and controlling operation of the memory device 130 and the I/O device 140. The controller 120 may also monitor and control various aspects of the processing device 110, including but not limited to, communication between various components of the computer system 105 and the processing device 110. In various embodiments, the controller may be coupled with the processing device 110 via interconnect 122.

The memory device 130 stores instructions and/or data of the computer system 105. The memory device 130 may also store temporary variables or other intermediate information while the computer system 105 is executing instructions. The I/O device 140 is the interface between the computer system 105 and an external system or device. The I/O device 140 may communicate with the external system or device via a connection 144. Connection 144 may be wired or wireless or any other means known to one skilled in the art. In one embodiment, the I/O device 140 may communicate with the processing device 110 via interconnect 142 through the I/O device 116. The power management device 115, the memory device 130 and the I/O device 140 may also communicate with each other via interconnects (not shown).

The components illustrated in the computer system 105 are not meant to be limiting and are presented for purposes of illustration. In other embodiments, the configuration of the computer system 105 includes other (more or less) components than shown in FIG. 1. One of ordinary skill in the relevant art will appreciate that other configurations of the computer system 105 can be used without affecting the workings of the embodiments described herein.

In certain embodiments, the power management device 115 is configured to provide dynamic temporal power steering that identifies opportunities to redistribute power among a plurality of different phases of a particular application while adhering to global system constraints such as global power limits. The power domains may include, for example, a core domain comprising the one or more processing cores 112, and an uncore domain comprising the graphics processing unit 114, the I/O device 116, the memory device 118, and any other uncore components (not shown). In addition, or in other embodiments, the one or more processing cores 112 may comprise a plurality of power domains, each corresponding to a respective processing core (not necessarily uniformly sized). Further, any of the elements shown in FIG. 1 (i.e., the controller 120, the memory device 130, the I/O device 140, the processing device 110, the power management device 115, the one or more processing cores 112, the graphics processing unit 114, the I/O device 116, and the memory device 118) may be a separate power domain, combined with any other element(s) in a separate power domain, and/or divided into a plurality of different power domains.

The one or more processing cores 112 may execute applications that demonstrate behavior where the same phases occur over and over again. Because each of the phases may have different resource needs and generate different amounts of activity in the resources on the processing device 110, the best allocation of power among resources or domains on the processing device 110 may be different for each phase. To achieve optimal or improved performance (or maximize other power management objective functions such as efficiency, EDP, ED2P, etc., the power management device 115 is configured according to certain embodiments to increase or decrease power distributed among the different power domains so as to redistribute power between different phases of an application.

Figure 2A:
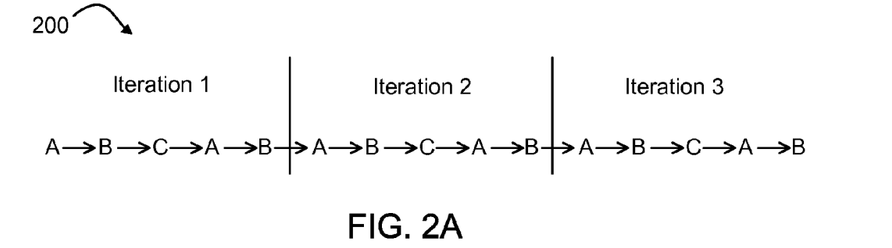
FIGS. 2A, 2B, and 2C illustrate example repeating sequences of phases according to certain embodiments.

Certain applications may display a behavior where a sequence of phases occurs several times as the application iterates to complete its work. For example, FIGS. 2A, 2B, and 2C illustrate example repeating sequences of phases according to certain embodiments. FIG. 2A shows a sequence 200 of phases including phase "A" followed by phase "B" followed by phase "C" followed by phase "A" followed by phase "B". The sequence repeats in "Iteration 1" followed by "Iteration 2" followed by "Iteration 3". Such repetition lends itself to performance optimization through certain dynamic temporal power steering embodiments. For example, the power management device 115 may be configured to recognize that phase A, phase B, and phase C repeat, and are likely to repeat in many iterations. In response, the power management device 115 determines, over one or more iterations, an optimal or improved temporal power allocation among the power domains for phase A, phase B, and phase C (e.g., by saving or limiting power in one phase and applying or increasing the power limit in another phase). The power management device 115 applies the optimal or improved power distribution between phase A, phase B, and/or phase C in each subsequent iteration.

Figure 2B:
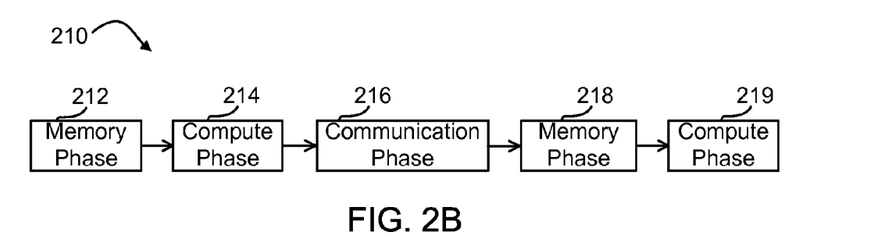

Applications may have phases with distinct operational behavior and resource activity patterns which can be observed and leveraged to allocate power more efficiently. For example, FIG. 2B shows a sequence 210 of phases including a memory phase 212 followed by a compute phase 214 followed by a communication phase 216 followed by the memory phase 212, followed by the compute phase 214. The memory phase 212 exhibits high activity in computer memory resources and lower activity in compute and communication resources. Similarly, the compute phase 214 and communication phase 216 exhibit biased compute and communication activity, respectively. As with the example shown in FIG. 2A, the sequence 210 may repeat in many iterations. In other embodiments, the memory phase 212, compute phase 214, communication phase 216, mixed memory/compute/communication phases, and/or other phases do not always occur in the same sequence, or in a predictable sequence. In such embodiments, the power management device 115 still recognizes the occurrence of each phase within a time interval corresponding to a power budget and applies the temporal power distribution within the sequence 210.

By way of example (and not by limitation), the power management device 115 may determine that the first memory phase 212 is associated with application behavior that is dominated by interactions between the processing device 110 and the memory device 130 of the computer system 105, and that the first compute phase 214 is associated with application behavior that is dominated by computation in the one or more cores 112 (e.g., rather than memory accesses and/or communication with other devices). Suppose that a system power cap is 100 W, which is evaluated as the average power used by the computer system 105 over some time period t. Also assume that the unconstrained power usage (i.e., the power that the phase requires to run at full performance) of the first memory phase 212 is 90 W, which is 10 W lower than the power cap of 100 W and takes 5 seconds to run. Next, assume that the unconstrained power usage of the first compute phase is 120 W, which is 20 W higher than the power cap of 100 W. Also assume in this example that when the first compute phase 214 is constrained to use 100 W, the first compute phase 214 takes 10 seconds to run.

If, in this example, the power management device reserves 100 W of power for each phase regardless of how much power it needs to reach full performance, then there will be 10 W of power wasted for the duration of the first memory phase 212. Further, as shown by the equations below, the average power usage over the first memory phase 212 and the first compute phase 214 will be 96.67 W, which is less than the power cap of 100 W.

$$\text{Average Power} = \frac{PWR(Mem) \times Runtime(Mem) + PWR(Comp) \times Runtime(Comp)}{Runtime_{Mem} + Runtime_{Comp}}$$

$$\text{Average Power} = \frac{90 \text{ W} \times 5 \text{ secs} + 100 \text{ W} \times 10 \text{ secs}}{5 \text{ secs} + 10 \text{ secs}}$$

$$\text{Average Power} = \frac{1450 \text{ Joules}}{15 \text{ secs}} = 96.67 \text{ W} < \text{Power Cap} = 100 \text{ W}$$

In the equations above, PWR(Mem) is the power allocated the first memory phase 212 during a first time period Runtime(Mem), and PWR(Comp) is the power allocated to the first compute phase 214 second time period Runtime (Comp). The above equations in this example illustrate how reserving power for each phase equal to the average power cap may lead to sub-optimal usage of power.

However, if the power management device 115 allocates the first compute phase 214 more than 100 W, the performance of that phase may improve and the performance of the whole application may be improved. Assume, for example, that at a power limit of 105.6 W, the first compute phase 214 has a runtime of 9 seconds as compared to 10 seconds at a power limit of 100 W. If the power management device 115 allocates the compute-limited phase 105.6 W, then the average power usage would be:

$$\text{Average Power} = \frac{90 \text{ W} \times 5 \text{ secs} + 105.6 \text{ W} \times 9 \text{ secs}}{5 \text{ secs} + 9 \text{ secs}}$$

$$\text{Average Power} = \frac{1400 \text{ Joules}}{14 \text{ secs}} = 100 \text{ W} \leq \text{Power Cap} = 100 \text{ W}$$

As illustrated by the above example, certain dynamic temporal power steering embodiments identify sub-optimal use of power across phases and correct it by temporarily violating the system-imposed power cap, while ensuring that over the evaluated time period, the average power does not violate the system power cap. As a result, the whole application's performance is improved (e.g., the runtime across the two phases in the above example was reduced from 15 seconds to 14 seconds).

In certain embodiments, the power management device 115 includes a dynamic temporal power scheduler (not shown) that monitors and learns the characteristics of phases. The dynamic temporal power scheduler learns how performance scales with power for each of the application phases. The dynamic temporal power scheduler also recognizes cases where improved application performance may be obtained by slowing down one or more phases of the application with poor performance-power scaling through limiting power and transferring that power to phases with better performance-power scaling.

Continuing the above example (and not by way of limitation), assume that the dynamic temporal power scheduler has learned that at a power limit of 80 W, the first memory phase 212 loses some performance and takes 6 seconds instead of 5 seconds to complete; and that at a power limit of 117.1 W, the first compute phase 214 is able to finish in 7 seconds instead of 10 seconds at 100 W. The average power would then be:

$$\text{Average Power} = \frac{80 \text{ W} \times 6 \text{ secs} + 117.1 \text{ W} \times 7 \text{ secs}}{6 \text{ secs} + 7 \text{ secs}}$$

$$\text{Average Power} = \frac{1300 \text{ Joules}}{13 \text{ secs}} = 100 \text{ W} \leq \text{Power Cap} = 100 \text{ W}$$

The above example power allocations fulfill the requirement that the average power used by the application not exceed the system power cap (100 W). However, now the runtime across the two phases in the above example is reduced from 15 seconds to 13 seconds. This example illustrates how dynamic temporal power steering, by learning how phase runtime is related to the amount of power allocated during the phase, can make globally optimal or improved power decisions in the temporal domain (i.e., across phases). In doing so, the dynamic temporal power scheduler is able to identify counter-intuitive decisions such as constraining power of certain phases so that the saved energy can be used to improve some objective function (e.g., efficiency, performance, etc.), while adhering to global system constraints such as global power limits.

While the above examples for the first memory phase 212 and the first compute phase 214 are provided by way of illustration, it should be noted that many applications may have long, memory-dominated phases where most of the work is sending memory requests to a memory controller. Because memory accesses take time, the application can spend a significant portion of time simply waiting for the memory access to come back. Conversely, because HPC and other systems are power constrained, compute-bound phases that heavily utilize power-hungry resources, like a vector unit, significantly benefit from even marginal increases in power allotment. Thus, in many cases, the absolute value of the performance lost in phases with poor performance-power scaling from marginal decreases in power allotment is less than the absolute value of the performance gained in phases with better performance-power scaling from marginal increases in power allotment. As a consequence, whole-application performance is improved, power is used more efficiently, and the average power used by the application does not exceed the system power limit. While the above descriptions use performance as an example, this embodiments may extend to other objective functions (e.g., efficiency, performance, etc.).

It may also be noted that reducing power of phases with poor performance-power scaling may not have endless benefit. For example, after a point, turning down the power for memory-limited phases may no longer have merely a marginal impact on performance; when power is limited past some inflection point, performance of the phase can drop precipitously and actually hurt application performance overall despite benefits to other phases that receive the additional power. Thus, the dynamic temporal power scheduler is configured, according to certain embodiments, to find the amount of power to steer between phases such that the whole application's performance is maximized or improved.

In certain embodiments, the power management device 115 is further configured to spatially redistribute power within the processing device 110 and/or the computer system 105 based on the current phase in the sequence 210. In the first memory phase 212, for example, the power management device 115 may determine that power domains associated with the one or more processing cores 112 require less power. Accordingly, the power management device 115 may reduce the power allocated to the one or more processing cores 112 during the memory phase 212 (e.g., to save energy) and/or redistribute at least a portion of the power to other power domains (e.g., to increase performance of resources involved in the memory phase 212).

Figure 2C:
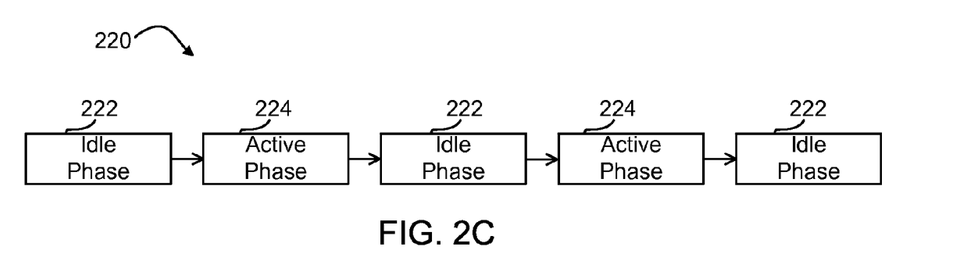

As another example, FIG. 2C shows a sequence 220 that alternates between an idle phase 222 and an active phase 224. The power management device 115 may be configured, for example, to control the duty cycle of processing comprising (forced or unforced) idle periods and active periods. In some embodiments, during an idle period, the processing device 110 may be placed into an state period and does not actively process hardware and software operations. The processing device 110 may be placed into the idle state across the part or all of the device, including the components such as the one or more processing cores 112, the graphics processing unit 114, the I/O device 116, the memory device 118, and any other uncore components. In another embodiment, the processing device 110 may process only the operations essential for keeping the computer system 105 functioning correctly. In other embodiments, the processing device 110 may process some, but not all software and hardware operations based upon the throttling threshold. The power management device 115 is configured to determine an optimal or improved power distribution between the idle phase 222 and the active phase 224 for a particular application, and redistribute the power accordingly during execution.

Figure 3:
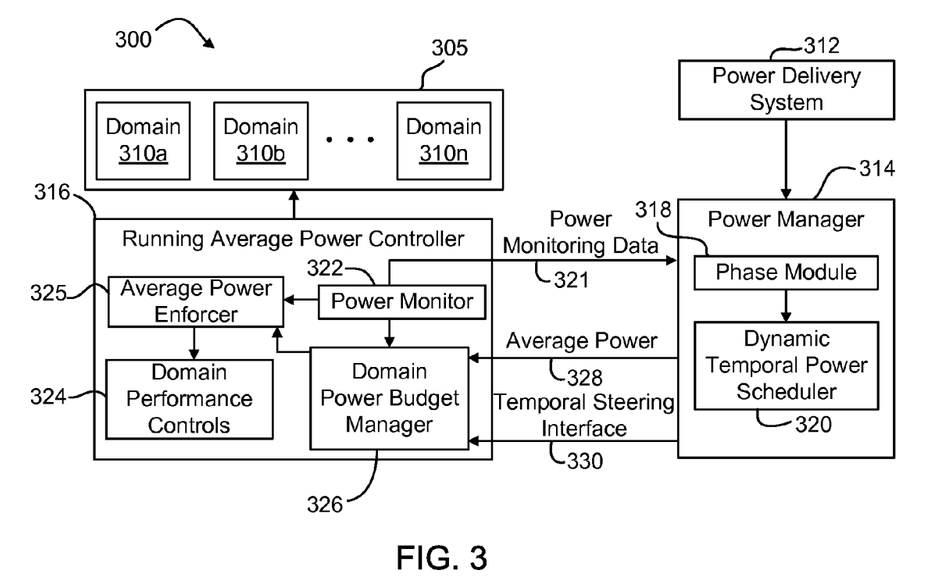
FIG. 3 is a block diagram of an apparatus according to certain embodiments.

FIG. 3 is a block diagram of an apparatus 300 including a node 305 comprising a plurality of power domains (shown as domains 310a, 310b, . . . , 310n), a power delivery system 312, a power manager 314 and a running average power controller 316. The node 305 may comprise, for example, a computing system such as the computer system 105 shown in FIG. 1. In such an embodiment, each domain 310a, 310b, . . . , 310n may include a separate processing device 110. In other examples, the node 305 may be a server or a computing system component such as a microprocessor, an individual core of a multi-core microprocessor, a memory controller hub (MCH), an input/output controller hub (IOH), a memory device, a network interface, or any other type device having one or more power domains that are capable of being monitored and controlled for power consumption. The illustrated power delivery system 312 may include a switching or linear voltage regulator (VR, not shown) capable of supplying a range of voltages to the node 305.

The illustrated power manager 314, which includes a phase module 318 and a dynamic temporal power scheduler 320, may be a third party element or included in the power delivery system 312, and may be implemented in fixed functionality hardware, microcode, firmware, software, or any combination thereof. In other embodiments, the power manager 314 may be included in or executed by the node 305. For example, the node 305 may include one or more processing cores configured to implement the power manager 305. The phase module 318 is configured to detect phases of an application or process executed by the node 305. Certain embodiments include, for example, a software application program interface (API) that allows a user such as a runtime developer, library developer, or application programmer to annotate and recompile software code so that the code communicates phase information to the power manager 314. The phase module 318 uses the phase information compiled with the code to determine during runtime that a phase is being entered or exited. The API may be lightweight to minimize overhead introduced into the code. The API may insert, for example, one or more API calls into the code for each phase.

In certain embodiments of the API, a shared library may be used to allow an operating system (e.g., Linux) to insert an instrumentation layer between the application and the shared library. While a user may need to write the instrumentation layer, such an embodiment does not require modification to or a recompile of the application or shared libraries. Further, since the libraries have a standard API used by the application, one instrumentation layer may support any shared library implementing the API. Further, if a re-link is possible, then this example embodiment may use statically linked libraries as well.

In addition, or in other embodiments, the phase module 318 is configured to support a mode that infers the phase automatically. Such embodiments do not instrument the application. Rather, the apparatus 300 measures application activity via hardware performance monitoring capabilities. For example, the apparatus 300 samples and analyzes traces of hardware performance counters. At runtime, the phase module 318 applies time series signal processing analysis to the traces to break the trace of application execution into segments of steady behavior. Then, the phase module 318 applies clustering techniques to recognize recurring segments as application phases. For example, the phase module 318 may use ARIMAX autoregression with recursive least squares to learn and predict what the traces of performance counters will be in a next time step. When the prediction is wrong, the phase module 318 determines that the application might be changing phases. The phase module 318 may apply a stabilization loop to filter spurious mispredictions. If, however, the misprediction is not spurious, the phase module 318 identifies a point in time in which the phase changed.

In certain embodiments, the phase module 318 includes a state machine to determine if the application is entering a phase or leaving a phase. For each phase, the phase module 318 keeps track of an application activity signature. The signature is a vector of characteristics including, for example, intensity of computation, communication, or memory derived from the performance counter activity being monitored. To determine what phase is currently being executed, the phase module 318 uses the activity signature and applies a spatial clustering technique. The phase module 318 partitions the space of possible signatures into equally sized regions and gives each region a corresponding phase number. There may be, by way of example only and not by limitation, a hundred or more different regions/phases. When the application enters a phase, the phase module 318 looks up which region of the space the phase's signature falls within, and labels that phase with a number or identifier designated for the region. The dynamic temporal power scheduler 320 receives the phase number or identifier and determines an optimal or improved power allocation for each phase.

The dynamic temporal power scheduler 320 is configured to determine which phases to steer power between. One embodiment uses the software API referenced above. The API enables users such as developers to annotate whether phases should be optimized for power saving or for acceleration. The dynamic temporal power scheduler 320 learns how much power to take away from the phases designated for power savings and how much power to add to the phases designated for acceleration for maximum or increased performance. For example, the dynamic temporal power scheduler 320 may use an exhaustive search over all possibilities or prune the search intelligently via gradient-descent methods or machine learning. The search may be bounded by the constraint that the power assigned to each phase results in the total energy (summed across phases) matching the energy budget implied by the power cap. In other words, the power cap is an average power over a time interval that is longer than the phases, and the product of the power cap and the time interval equals the energy budget.

To find allocations that meet the constraints, according to certain embodiments, the dynamic temporal power scheduler 320 measures (for each phase) how the phase's runtime scales with power and records this power scaling information into a table. When experimenting with allocations, the tables with the power scaling information are consulted to rule out inconsistent allocations. In other embodiments, the dynamic temporal power scheduler 320 measures how the phase's runtime scales with power and quickly corrects for allocations that are inconsistent with the overall constraints.

In certain embodiments, the dynamic temporal power scheduler 320 predicts the sequence of phases to know which phases will fall between a phase designated for power savings and the next accelerated phase. The apparatus 300 may, for example, keep a trace of phases over time. Certain embodiments assume that the phases between power saving phases and accelerated phases are always the same so that the dynamic temporal power scheduler 320 can predict the next phases based only on the current phase and what sequence occurred last time the application was in this phase. Many bulk-synchronous HPC applications, for example, fit this assumption. In addition, or in other embodiments, branching (or variability in which phases fall between power saving phases and accelerated phases) may be accommodated by predicting the next phases via machine learning methods.

Other embodiments do not use information from an API or annotations provided by the software to designate which phases should save power and which should accelerate. In certain such embodiments the dynamic temporal power scheduler 320 uses automatic phase detection and the activity signature described above. Through the signature, the dynamic temporal power scheduler 320 determines, for example, which phases are memory intensive, communication intensive, and compute intensive. The dynamic temporal power scheduler 320 may, for example, designate memory and communication intensive phases as phases where power should be saved, and compute intensive phases as phases that should be accelerated. Then, as discussed above, the dynamic temporal power scheduler 320 searches for an optimal or improved allocation of power between phases constrained by matching energy budget requirements implied by the average power cap.

In addition, or in other embodiments, the dynamic temporal power scheduler 320 adapts to changing system configurations, runtime events, and other behavior changes. For example, it may happen that the application behavior changes (e.g., a new application starts running), a system administrator may change the desired objective function of the power manager 314 (e.g., switching from energy efficiency to maximum performance), and/or a fundamental system constraint may change (e.g., the power cap or total power available). The dynamic temporal power scheduler 320 is configured to automatically adjust to the changes in runtime operational behavior by again determining or relearning the optimal or improved allocation of power between the phases as the node 305 executes the application. The dynamic temporal power scheduler 320 may perform a relearning procedure when, for example, directed by user input, periodically every pre-determined time interval, and/or in a mode where the relearning procedure is launched automatically in response to detecting changes in the system.

The running average power controller 316 includes a power monitor module 322, a domain performance controls module 324, an average power enforcer module 325, and a domain power budget manager module 326. Although the running average power controller 316 is shown as a separate device or module, the running average power controller 316 may be part of or executed by the power manager 314 or the node 305. The running average power controller 316 is configured to monitor and control the power in the various power domains 310a, 310b, . . . , 310n of the node 305 based on an average power signal 328 (e.g., indicating an overall average power for the node 305) and a temporal steering interface 330 received from the power manager 314. Depending on the implementation, the temporal steering interface 330 may comprise, for each phase, a power limit for each domain or group of domains, a null value indicating that it is up to the domain power budget manager module 326 to determine power distribution autonomously through internal heuristics, and/or an indication of relative importance or influence of each domain (e.g., leaving it to the domain power budget manager module 326 to determine power distribution based on the relative importance or influence).

The power monitor module 322 is configured to measure the power consumption of the various power domains 310a, 310b, . . . , 310n and to provide corresponding power monitoring data 321 to the phase module 318 and/or the dynamic temporal power scheduler 320, as discussed above. The power monitor module 322 also provides the power monitoring data to the average power enforcer 325 and the domain power budget manager 326.

The domain performance controls module 324 includes controls to adjust the performance and power of each domain through, for example, adjusting frequency, throttling bandwidth, and/or other performance parameters. In certain embodiments, performance levels may be defined and selected in a number of different ways. One approach is to select a performance state, or Px state where a device in the P0 state uses maximum performance capability and may consume maximum power, a device in the P1 state has a performance capability that is limited below its maximum and consumes less than maximum power, and so on. The average power enforcer module 325 configures the domain performance controls module 324 and adapts the configuration over time to maintain an overall average power indicated by the average power signal 328 for the node 305 over a programmable time window. The average power enforcer module 325 comprises a control system that may be implemented with standard controller techniques. The domain power budget manager module 326 comprises logic that outputs power budgets to the average power enforcer module 325. The domain power budget manager module 326 may provide several different interfaces to the dynamic temporal power scheduler 320 that enable it to either directly specify specific power budgets for each domain (e.g., in units proportional to Watts) or to specify budgets indirectly by specifying hints about relative importance or influence of each domain (in abstract units) and letting the domain power budget manager module 326 apply internal heuristics to the hints and map them to specific budgets for the domains.

Figure 4:
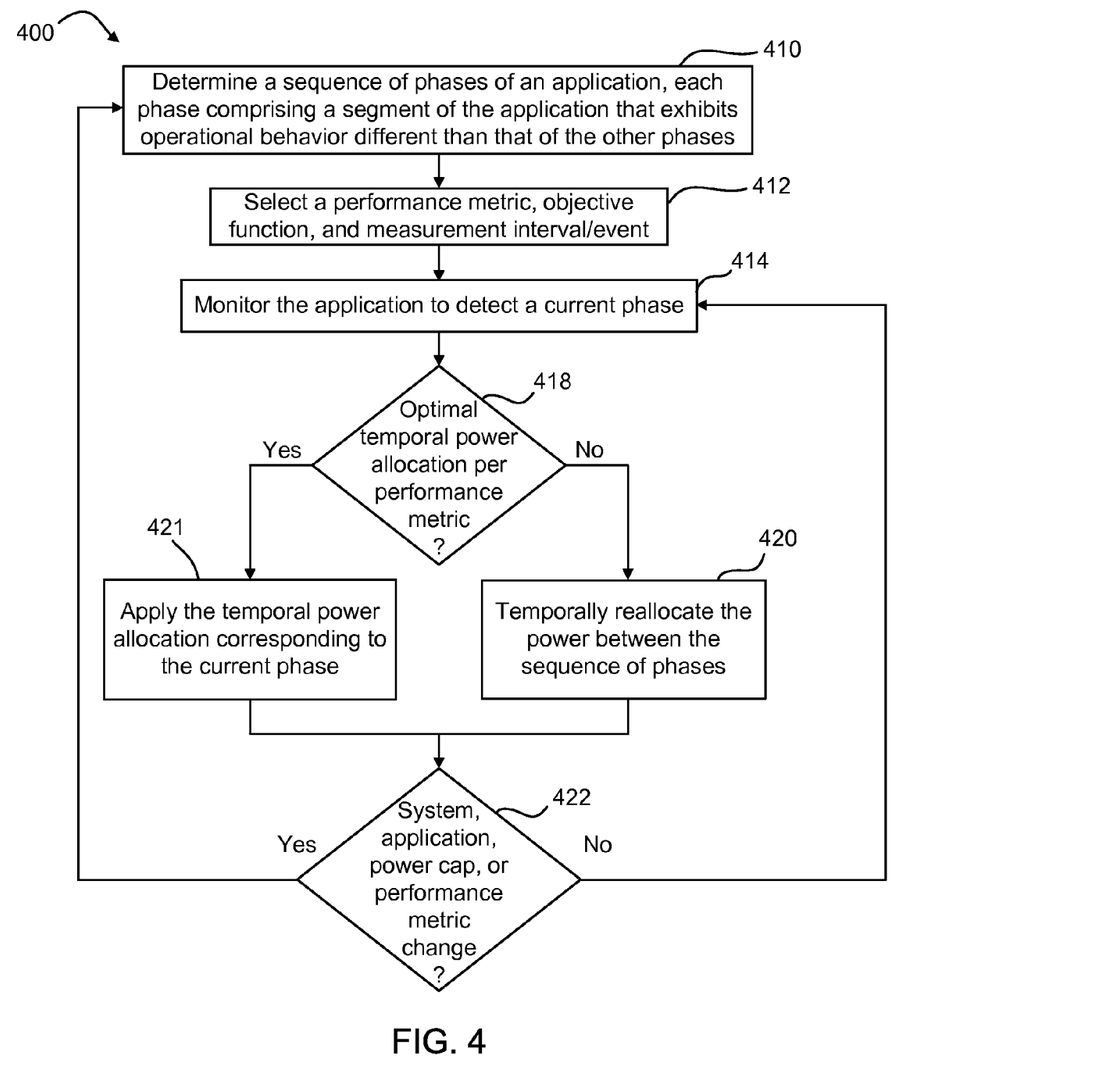
FIG. 4 is a flow chart of a method for dynamic temporal power steering according to one embodiment.

FIG. 4 is a flow chart of a method 400 for dynamic temporal power steering according to one embodiment. The method 400 includes determining 410 a sequence of phases of an application, wherein each of the plurality of phases comprises a segment of the application that exhibits operational behavior different than that of the other phases. The sequence corresponds to a time interval associated with an energy budget. The method 400 also includes selecting 412 a performance metric, objective function, and measurement interval and/or event (e.g., a phase change or an end of an iteration). A variety of different definitions of performance may be used, and performance may be measured at a variety of different granularities. Thus, performance can be defined through a metric such as rate of instructions retired, floating-point operations per second (FLOPS), rate of progress, or runtime. Such rates, runtimes, or other performance metrics can be computed at various granularities. For example, the selected performance metric may be measured at short time intervals within each phase, measured upon an event such as the end of each phase, measured at time intervals longer than the phase, measured upon an event such as the end of an iteration (for iterative applications), etc. The method 400 further includes monitoring 414 the application to detect a current phase.

In certain embodiments, the method 400 further includes querying 418 whether an optimal temporal power allocation has been achieved per the selected performance metric. In other words, the method 400 may run one or more iterations with a sub-optimal temporal allocation between phases, and measure performance during each phase and across a plurality of phase boundaries to search for an improved or optimal allocation. Several methods may be used to determine whether the optimal temporal power allocation has been achieved. For example, the method 400 may try many or all permutations (i.e., possible power allocations) and compare the resulting measured performances to determine the optimal distribution. As another example, the method 400 may approximate optimality by using a gradient search method (i.e., estimate gradient of performance metric with respect to the power allocation variables and step in the gradient direction, only trying permutations along the gradient path). In yet another example, if the space of permutations is large, instead of searching the space of permutations exhaustively, the method 400 may apply various sampling methods and take the best allocation among those allocations tried.

If the measurements determine that the optimal temporal power allocation across the sequence of phases has not been reached (or can be further improved), then the method 400 includes temporally reallocating 420 the power between the sequence of phases. If, however, the measurements determine that the optimal temporal power allocation across the sequence of phases has been reached, the method 400 includes applying 421 the temporal power allocation corresponding to the current phase to the plurality of power domains. In certain embodiments, for example, the power manager 314 or the domain power budget manager 326 shown in FIG. 3 may be configured to determine how the power limit allocated to the current phase is spatially distributed across the plurality of power domains. In other embodiments, as discussed below with respect to FIG. 5, a spatial power steering algorithm may be used to optimize spatial power allocation across the power domains for a particular power limit for the current phase (as determined by temporal power steering).

The method 400 also includes querying 422 whether there is a system change, application change, power cap change, or selected performance metric change. If not, the method 400 continues monitoring 414 the application to detect a current (or next) phase and to continue optimizing the temporal allocation of power across the sequence of phases. If, on the other hand, there is a determined system change, application change, power cap change, or selected performance metric change, the method 400 repeats by again determining 410 a sequence of phases, and/or selecting 412 a performance metric, objective function, and measurement interval/event, before monitoring 414 the application to detect a current phase and again querying 418 whether an optimal temporal power allocation has been achieved.

Figure 5:
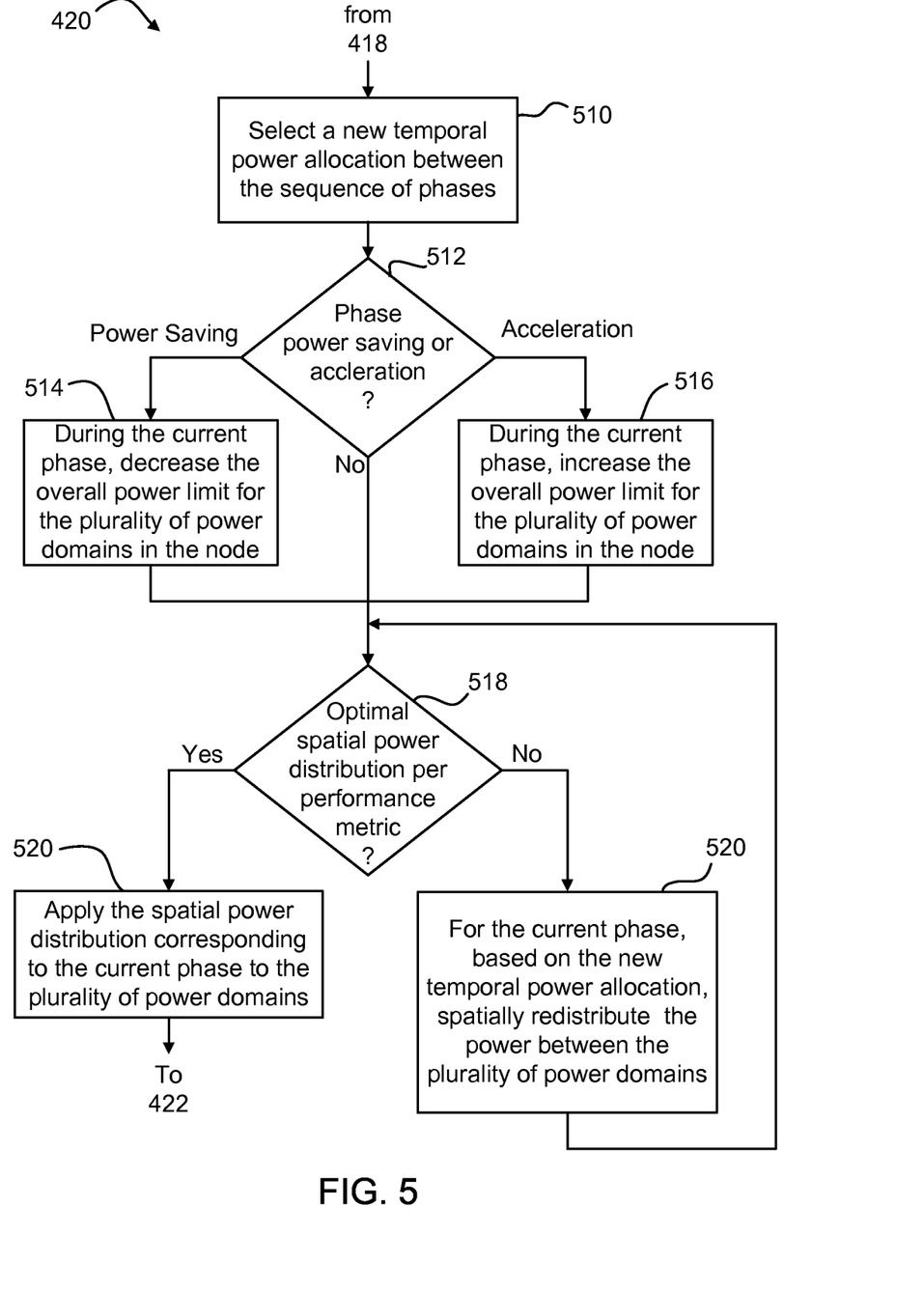
FIG. 5 is a flow chart of a method for both temporal power distribution and spatial power steering according to one embodiment.

As discussed above, certain embodiments include a combination of dynamic temporal power steering across phase boundaries and dynamic spatial power steering among power domains for each phase. In certain such embodiments, the dynamic spatial power steering may be nested within the method 400 for dynamic temporal power steering. For example, FIG. 5 is a flow chart of a method for temporally reallocating 420 the power between the plurality phases, as shown in FIG. 4, which also includes dynamic spatial power steering according to one embodiment. After querying 418 whether an optimal temporal power allocation has been achieved per the selected performance metric, as shown in FIG. 4, and determining that the optimal temporal power allocation across the sequence of phases has not been reached (or can be further improved), then FIG. 5 shows that temporally reallocating 420 the power between the sequence of phases may include selecting 510 a new temporal power allocation between the sequence of phases and querying 512 whether the current phase, based on the new temporal power distribution, is designated for power saving, acceleration, or neither. In certain embodiments, the query may include determining how (or refining a previous determination of how) the current phase's runtime scales with power variation.

If the current phase is designated for power saving, the method includes, during the current phase, decreasing 514 the overall power limit for the plurality of power domains in the node according to the new temporal power allocation. If the current phase is designated for acceleration, the method includes, during the current phase, increasing 516 the overall power limit for the plurality of power domains in the node according to the new temporal power allocation. If the current phase designated for neither power saving nor acceleration, the method maintains the overall power limit of the current phase according to the energy budget.

The method shown in FIG. 5 further includes querying 518 whether an optimal spatial power distribution among the plurality of power domains has been achieved for the current phase per the selected performance metric. If measurements determine that the optimal spatial power distribution has not been reached (or can be further improved), then the method includes, for the current phase, based on the new temporal power allocation (i.e., the new power limit for the current phase based on the new temporal power allocation between phases), spatially redistributing 520 the power between the plurality of power domains. The method again queries 518 whether the redistributed power provides an optimal spatial power distribution among the plurality of power domains. When the measurements determine that an optimal or sufficient spatial power distribution has been reached, the method includes applying 522 the spatial power distribution corresponding to the current phase to the plurality of power domains. Then, the method continues as shown in FIG. 4, i.e., by querying 422 whether there is a system change, application change, power cap change, or selected performance metric change.

EXAMPLE EMBODIMENTS

The following are examples of further embodiments. Examples may include subject matter such as a method, means for performing acts of the method, at least one machine-readable medium including instructions that, when performed by a machine cause the machine to perform acts of the method, or of an apparatus or system for rendering augmented video according to the embodiments and examples described herein.

Example 1 is a method including determining, using a power manager, a sequence of phases corresponding to an application comprising tasks for execution on a node. The sequence corresponds to a time interval associated with an energy budget. The method further includes, for each phase, determining a power scaling comprising a measured response in runtime to an increase or decrease in power distributed to a plurality of power domains in the node. Based on the power scaling for each phase, the method also includes determining a temporal power distribution between the phases in the sequence to satisfy the energy budget and improve or optimize runtime performance of the application by the node.

Example 2 includes the subject matter of Example 1, and further includes selecting a performance metric, an objective function, and at least one of a measurement interval and a measurement even for evaluating the performance metric. The performance metric is selected to improve or optimize the runtime performance of the application by the node. The objective function is selected from a group comprising maximizing performance within a power cap, maximizing performance, maximizing energy efficiency within a power cap, and maximizing efficiency.

Example 3 includes the subject matter of Example 2, and further includes: monitoring the application to detect a current phase; determining that, in the current phase, the temporal power allocation does not satisfy the objective function; and in response to the determination, temporally reallocating the power between the sequence of phases.

Example 4 includes the subject matter of Example 3, wherein temporally reallocating the power between the sequence of phases comprises: selecting a new temporal power allocation between the sequence of phases; determining whether the current phase, based on the temporal power distribution, is designated for power saving or acceleration; if the current phase is designated for power saving, decreasing an overall power limit for the plurality of power domains in the node according to the new temporal power allocation; and if the current phase is designated for acceleration, increasing the overall power limit for the plurality of power domains in the node according to the new temporal power distribution.

Example 5 includes the subject matter of Example 4, further comprising detecting annotations in computer-executable code of the application indicating whether the current phase is designated for power saving or acceleration.

Example 6 includes the subject matter of Example 4, further comprising: determining that a spatial power distribution among the plurality of power domains in the node does not satisfy the objective function; and in response to the determination, based on the new temporal power allocation, spatially redistributing the power between the plurality of power domains in the current phase.

Example 7 includes the subject matter of any of Examples 1-6, further comprising: detecting change in at least one of the application, the node, a power cap, and a system comprising the node; and in response to the detected change, reconfiguring the temporal power distribution between the phases in the sequence.

Example 8 includes the subject matter of any of Examples 1-7, wherein determining the sequence of phases comprises detecting at least two of a compute bound phase, a memory bound phase, a communication bound phase, an idle phase, an active phase, and a combination of any of the foregoing phases.

Example 9 includes the subject matter of any of Examples 1-8, further comprising: for each of the phases in the sequence, determining the temporal power distribution based on a first iteration of the sequence; and for each of the phases in the sequence, applying the temporal power allocation in a second iteration of the sequence.

Example 10 is an apparatus comprising: a power manager comprising logic, at least a portion of which includes hardware, the power manager comprising: a phase module to determine a sequence of phases of an application, the sequence corresponding to a time interval associated with an energy budget, wherein each of the plurality of phases comprises a segment of the application that exhibits operational behavior different than that of the other phases; and a dynamic temporal power scheduler module to determine a temporal power distribution between the phases in the sequence to satisfy the energy budget and improve or optimize runtime performance of the application.

Example 11 includes the subject matter of Example 10, wherein the power manager is configured to select a performance metric, an objective function, and at least one of a measurement interval and a measurement event for evaluating the performance metric, the objective function selected to improve or optimize the runtime performance of the application.

Example 12 includes the subject matter of Example 11, wherein the phase module is further configured to monitor the application to detect a current phase, and wherein the dynamic temporal power scheduler module is further configured to: determine that, in the current phase, the temporal power allocation does not satisfy the objective function; and in response to the determination, temporally reallocate the power between the sequence of phases.

Example 13 includes the subject matter of Example 12, wherein to temporally reallocate the power, the dynamic temporal power scheduler module is further configured to: select a new temporal power allocation between the sequence of phases; determine whether the current phase, based on the temporal power distribution, is designated for power saving or acceleration; if the current phase is designated for power saving, decrease an overall power limit for the plurality of power domains in the node according to the new temporal power allocation; and if the current phase is designated for acceleration, increase the overall power limit for the plurality of power domains in the node according to the new temporal power distribution.

Example 14 includes the subject matter of Example 13, wherein the dynamic temporal power scheduler module is further configured to detect annotations in computer-executable code of the application indicating whether the current phase is designated for power saving or acceleration.

Example 15 includes the subject matter of Example 13, wherein the power manager is further configured to: determine that a spatial power distribution among the plurality of power domains in the node does not satisfy the objective function; and in response to the determination, based on the new temporal power allocation, spatially redistribute the power between the plurality of power domains in the current phase.

Example 16 includes the subject matter of any of Examples 10-15, wherein the power manager is further configured to: detect a change in at least one of the application, the node, a power cap, and a system comprising the apparatus; and in response to the detected change, reconfigure the temporal power distribution between the phases in the sequence.

Example 17 is a system comprising: a plurality of power domains comprising at least one core domain and at least one uncore domain; and at least one computer-readable storage medium having stored thereon instructions that, when executed by one or more processors, cause the one or more processors to perform operations comprising: determining a sequence of phases of an application executed by the system, the sequence corresponding to a time interval associated with an energy budget; for each phase, determining a power scaling comprising a measured response in runtime to an increase or decrease in power distributed to the plurality of power domains in the system; and based on the power scaling for each phase, determining a temporal power distribution between the phases in the sequence to satisfy the energy budget and improve or optimize runtime performance of the application by the system.

Example 18 includes the subject matter of Example 17, wherein the operations further comprise selecting a performance metric, an objective function, and at least one of a measurement interval and a measurement event for evaluating the performance metric, the performance metric selected to improve or optimize the runtime performance of the application by the system.

Example 19 includes the subject matter of Example 18, wherein the operations further comprise: monitoring the application to detect a current phase; determining that, in the current phase, the temporal power allocation does not satisfy the objective function; and in response to the determination, temporally reallocating the power between the sequence of phases.

Example 20 includes the subject matter of Example 19, wherein the operations further comprise, for temporally reallocating the power between the sequence of phases: selecting a new temporal power allocation between the sequence of phases; determining whether the current phase, based on the temporal power distribution, is designated for power saving or acceleration; if the current phase is designated for power saving, decreasing an overall power limit for the plurality of power domains in the system according to the new temporal power allocation; and if the current phase is designated for acceleration, increasing the overall power limit for the plurality of power domains in the node according to the new temporal power distribution.

Example 21 includes the subject matter of Example 20, wherein the operations further comprise detecting annotations in computer-executable code of the application indicating whether the current phase is designated for power saving or acceleration.

Example 22 includes the subject matter of Example 20, wherein the operations further comprise: determining that a spatial power distribution among the plurality of power domains in the node does not satisfy the performance metric; and in response to the determination, based on the new temporal power allocation, spatially redistributing the power between the plurality of power domains in the current phase.

Example 23 includes the subject matter of any of Examples 17-22, wherein the operations further comprise: detecting change in at least one of the application, the node, a power cap, and a system comprising the node; and in response to the detected change, reconfiguring the temporal power distribution between the phases in the sequence.

Example 24 includes the subject matter of any of Examples 17-23, wherein the operations further comprise, for determining the sequence of phases: detecting at least two of a compute bound phase, a memory bound phase, a communication bound phase, an idle phase, an active phase, and a combination of any of the foregoing phases.

Example 25 includes the subject matter of any of Examples 17-24, wherein the operations further comprise: for each of the phases in the sequence, determining the temporal power distribution based on a first iteration of the sequence; and for each of the phases in the sequence, applying the temporal power allocation in a second iteration of the sequence.

Example 26 is a machine readable storage including machine-readable instructions to implement a method or realize an apparatus as in any of Examples 1-9.

Example 27 is an apparatus comprising: means for determining a sequence of phases corresponding to an application comprising tasks for execution on a node, the sequence corresponding to a time interval associated with an energy budget; means for determining, for each phase, a power scaling comprising a measured response in runtime to an increase or decrease in power distributed to a plurality of power domains in the node; and means for determining, based on the power scaling for each phase, a temporal power distribution between the phases in the sequence to satisfy the energy budget and improve or optimize runtime performance of the application by the node.

Example 28 includes the subject matter of Example 27, further comprising means for selecting a performance metric, an objective function, and at least one of a measurement interval and a measurement even for evaluating the performance metric, the performance metric selected to improve or optimize the runtime performance of the application by the node, wherein the objective function is selected from a group comprising maximizing performance within a power cap, maximizing performance, maximizing energy efficiency within a power cap, and maximizing efficiency.

Example 29 includes the subject matter of Example 28, further comprising: means for monitoring the application to detect a current phase; means for determining that, in the current phase, the temporal power allocation does not satisfy the objective function; and means for temporally reallocating, in response to the determination, the power between the sequence of phases.

Example 30 includes the subject matter of Example 29, wherein the means for temporally reallocating the power between the sequence of phases comprises: means for selecting a new temporal power allocation between the sequence of phases; means for determining whether the current phase, based on the temporal power distribution, is designated for power saving or acceleration; means for decreasing an overall power limit, if the current phase is designated for power saving, for the plurality of power domains in the node according to the new temporal power allocation; and means for increasing the overall power limit, if the current phase is designated for acceleration, for the plurality of power domains in the node according to the new temporal power distribution.

Example 31 includes the subject matter of Example 30, further comprising means for detecting annotations in computer-executable code of the application indicating whether the current phase is designated for power saving or acceleration.

Example 32 includes the subject matter of Example 30, further comprising: means for determining that a spatial power distribution among the plurality of power domains in the node does not satisfy the objective function; and means for spatially redistributing the power between the plurality of power domains in the current phase in response to the determination, based on the new temporal power allocation.

Example 33 includes the subject matter of any of Examples 27-32, further comprising: means for detecting change in at least one of the application, the node, a power cap, and a system comprising the node; and means for reconfiguring the temporal power distribution between the phases in the sequence in response to the detected change.

Example 34 includes the subject matter of any of Examples 27-33, wherein the means for determining the sequence of phases comprises means for detecting at least two of a compute bound phase, a memory bound phase, a communication bound phase, an idle phase, an active phase, and a combination of any of the foregoing phases.

Example 35 includes the subject matter of any of Examples 27-34, further comprising: for each of the phases in the sequence, means for determining the temporal power distribution based on a first iteration of the sequence; and for each of the phases in the sequence, means for applying the temporal power allocation in a second iteration of the sequence.

The above description provides numerous specific details for a thorough understanding of the embodiments described herein. However, those of skill in the art will recognize that one or more of the specific details may be omitted, or other methods, components, or materials may be used. In some cases, well-known features, structures, or operations are not shown or described in detail.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Various embodiments may be implemented using hardware elements, software elements, and/or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art. The scope of the present invention should, therefore, be determined only by the following claims.

The invention claimed is:

1. A method comprising:
   determining, using a power manager, a sequence of phases corresponding to an application comprising tasks for execution on a node, the sequence corresponding to a time interval associated with an energy budget;
   for each phase, determining a power scaling comprising a measured response in runtime to an increase or decrease in power distributed to a plurality of power domains in the node;
   based on the power scaling for each phase, determining a temporal power distribution between the phases in the sequence to satisfy the energy budget and improve or optimize runtime performance of the application by the node.

2. The method of claim 1, further comprising selecting a performance metric, an objective function, and at least one of a measurement interval and a measurement event for evaluating the performance metric, the performance metric selected to improve or optimize the runtime performance of the application by the node, wherein the objective function is selected from a group comprising maximizing performance within a power cap, maximizing performance, maximizing energy efficiency within a power cap, and maximizing efficiency.

3. The method of claim 2, further comprising:
   monitoring the application to detect a current phase;
   determining that, in the current phase, the temporal power distribution does not satisfy the objective function; and
   in response to the determination, temporally reallocating the power between the sequence of phases.

4. The method of claim 3, wherein temporally reallocating the power between the sequence of phases comprises:
   selecting a new temporal power allocation between the sequence of phases;
   determining whether the current phase, based on the temporal power distribution, is designated for power saving or acceleration;
   if the current phase is designated for power saving, decreasing an overall power limit for the plurality of power domains in the node according to the new temporal power allocation; and
   if the current phase is designated for acceleration, increasing the overall power limit for the plurality of power domains in the node according to the new temporal power allocation.

5. The method of claim 4, further comprising detecting annotations in computer-executable code of the application indicating whether the current phase is designated for power saving or acceleration.

6. The method of claim 4, further comprising:
   determining that a spatial power distribution among the plurality of power domains in the node does not satisfy the objective function; and
   in response to the determination, based on the new temporal power allocation, spatially redistributing the power between the plurality of power domains in the current phase.

7. The method of claim 1, further comprising:
   detecting change in at least one of the application, the node, a power cap, and a system comprising the node; and
   in response to the detected change, reconfiguring the temporal power distribution between the phases in the sequence.

8. The method of claim 1, wherein determining the sequence of phases comprises detecting at least two of a compute bound phase, a memory bound phase, a communication bound phase, an idle phase, an active phase, and a combination of any of the foregoing phases.

9. The method of claim 1, further comprising:
   for each of the phases in the sequence, determining the temporal power distribution based on a first iteration of the sequence; and
   for each of the phases in the sequence, applying the temporal power distribution in a second iteration of the sequence.

10. An apparatus comprising:
    a power manager comprising logic, at least a portion of which includes hardware, the power manager comprising:
    a phase module to determine a sequence of phases of an application, the sequence corresponding to a time interval associated with an energy budget, wherein each of the plurality of phases comprises a segment of the application that exhibits operational behavior different than that of the other phases; and
    a dynamic temporal power scheduler module to determine a temporal power distribution between the phases in the sequence to satisfy the energy budget and improve or optimize runtime performance of the application.

11. The apparatus of claim 10, wherein the power manager is configured to select a performance metric, an objective function, and at least one of a measurement interval and a measurement event for evaluating the performance metric, the objective function selected to improve or optimize the runtime performance of the application.

12. The apparatus of claim 11, wherein the phase module is further configured to monitor the application to detect a current phase, and wherein the dynamic temporal power scheduler module is further configured to:
    determine that, in the current phase, the temporal power distribution does not satisfy the objective function; and
    in response to the determination, temporally reallocate the power between the sequence of phases.

13. The apparatus of claim 12, wherein to temporally reallocate the power, the dynamic temporal power scheduler module is further configured to:
    select a new temporal power allocation between the sequence of phases;
    determine whether the current phase, based on the temporal power distribution, is designated for power saving or acceleration;
    if the current phase is designated for power saving, decrease an overall power limit for a plurality of power domains in a node according to the new temporal power allocation; and
    if the current phase is designated for acceleration, increase the overall power limit for the plurality of power domains in the node according to the new temporal power allocation.

14. The apparatus of claim 13, wherein the dynamic temporal power scheduler module is further configured to detect annotations in computer-executable code of the application indicating whether the current phase is designated for power saving or acceleration.

15. The apparatus of claim 13, wherein the power manager is further configured to:

determine that a spatial power distribution among the plurality of power domains in the node does not satisfy the objective function; and in response to the determination, based on the new temporal power allocation, spatially redistribute the power between the plurality of power domains in the current phase.

16. The apparatus of claim 10, wherein the power manager is further configured to:

detect a change in at least one of the application, a node, a power cap, and a system comprising the apparatus; and in response to the detected change, reconfigure the temporal power distribution between the phases in the sequence.

17. A system comprising:

a plurality of power domains comprising at least one core domain and at least one uncore domain; and at least one non-transitory computer-readable storage medium having stored thereon instructions that, when executed by one or more processors, cause the one or more processors to perform operations comprising:

determining a sequence of phases of an application executed by the system, the sequence corresponding to a time interval associated with an energy budget;

for each phase, determining a power scaling comprising a measured response in runtime to an increase or decrease in power distributed to the plurality of power domains in the system;

based on the power scaling for each phase, determining a temporal power distribution between the phases in the sequence to satisfy the energy budget and improve or optimize runtime performance of the application by the system.

18. The system of claim 17, wherein the operations further comprise selecting a performance metric, an objective function, and at least one of a measurement interval and a measurement event for evaluating the performance metric, the performance metric selected to improve or optimize the runtime performance of the application by the system.

19. The system of claim 18, wherein the operations further comprise:

monitoring the application to detect a current phase;

determining that, in the current phase, the temporal power allocation does not satisfy the objective function; and in response to the determination, temporally reallocating the power between the sequence of phases.

20. The system of claim 19, wherein the operations further comprise, for temporally reallocating the power between the sequence of phases:

selecting a new temporal power allocation between the sequence of phases;

determining whether the current phase, based on the temporal power distribution, is designated for power saving or acceleration;

if the current phase is designated for power saving, decreasing an overall power limit for the plurality of power domains in the system according to the new temporal power allocation; and if the current phase is designated for acceleration, increasing the overall power limit for the plurality of power domains in the system according to the new temporal power allocation.

21. The system of claim 20, wherein the operations further comprise detecting annotations in computer-executable code of the application indicating whether the current phase is designated for power saving or acceleration.

22. The system of claim 20, wherein the operations further comprise:

determining that a spatial power distribution among the plurality of power domains in the system does not satisfy the performance metric; and in response to the determination, based on the new temporal power allocation, spatially redistributing the power between the plurality of power domains in the current phase.

23. The system of claim 17, wherein the operations further comprise:

detecting change in at least one of the application, a node, a power cap, and a system comprising the node; and in response to the detected change, reconfiguring the temporal power distribution between the phases in the sequence.

24. The system of claim 17, wherein the operations further comprise, for determining the sequence of phases: detecting at least two of a compute bound phase, a memory bound phase, a communication bound phase, an idle phase, an active phase, and a combination of any of the foregoing phases.

25. The system of claim 17, wherein the operations further comprise:

for each of the phases in the sequence, determining the temporal power distribution based on a first iteration of the sequence; and for each of the phases in the sequence, applying the temporal power distribution in a second iteration of the sequence.

* * * * *